United States Patent [19]

Sakurai et al.

[11] Patent Number: 4,597,937
[45] Date of Patent: Jul. 1, 1986

[54] FUEL SPACER

[76] Inventors: Mikio Sakurai, 2274-38, Senba-cho, Mito-shi, Ibaraki-ken; Koki Yamauchi, Shigakuryo, 4-11-1, Johnan-cho; Shuji Suzuki, Shimohararyo, 4-3-17, Ayukawa-cho, both of Hitachi-shi, Ibaraki-ken, all of Japan

[21] Appl. No.: 511,905

[22] Filed: Jul. 8, 1983

[30] Foreign Application Priority Data

Jul. 9, 1982 [JP] Japan ................................ 57-119627

[51] Int. Cl.$^4$ .............................................. G21C 3/34
[52] U.S. Cl. ..................................... 376/441; 376/438; 376/442; 376/444; 376/462
[58] Field of Search ............... 376/441, 442, 446, 444, 376/462, 438

[56] References Cited

U.S. PATENT DOCUMENTS

| 3,802,995 | 4/1974 | Fritz et al. | 376/446 |
| 3,886,038 | 5/1975 | Raven | 376/442 |
| 3,904,475 | 9/1975 | Tashima | 376/441 |
| 4,089,742 | 5/1978 | Amaral et al. | 376/444 |
| 4,190,494 | 2/1980 | Olsson . | |
| 4,433,721 | 2/1984 | Biaggi | 376/442 |
| 4,448,745 | 5/1984 | Anthony | 376/444 |

FOREIGN PATENT DOCUMENTS

| 2117160 | 12/1971 | Fed. Rep. of Germany . |
| 1534275 | 7/1968 | France . |
| 2158437 | 6/1973 | France . |
| 1116811 | 6/1968 | United Kingdom . |

Primary Examiner—Deborah L. Kyle
Assistant Examiner—Richard W. Wendtland
Attorney, Agent, or Firm—Beall Law Offices

[57] ABSTRACT

A plurality of independent cells having a regular octagonal or circular cross section are arranged in the form of a lattice. Cross-sectionally square independent cells are substituted for two octagonal or circular cells in the central portion of the lattice arrangement. These two square independent cells are so formed that each side of the cells has the largest possible length when the cells are placed among the adjacent cells having a regular octagonal or circular cross section. Spacer support rods serving also as water rods are inserted into the square cells in such a fuel spacer, which consists of a combination of cells having a regular octagonal or circular cross section and cells having a square cross section as mentioned above, to form a fuel assembly.

24 Claims, 9 Drawing Figures

FUEL SPACER

BACKGROUND OF THE INVENTION

This invention relates to a fuel spacer for fuel assemblies in nuclear reactors, and more particularly to an independent cell type fuel spacer for fuel assemblies mentioned above.

A fuel spacer is used to arrange a plurality of fuel rods, which constitute a fuel assembly, while leaving therebetween gaps of a predetermined size, which are utilized as passages for a coolant.

Some spacers have been changed from a general type spacer of a lattice structure to a circular or regular octagonal independent cell type spacer disclosed in Japanese Patent Laid-Open No. 87384/1979 (basic application: Swedish Application No. 7714562-1 filed on Dec. 21, 1977); in a general type spacer, a pressure loss which occurs due to resistance to the water flow is occasionally a cause of flow instability and, in an independent cell type spacer, a pressure loss can be reduced to an advantageously low level.

It is necessary that a plurality of fuel spacers be arranged at predetermined intervals in the axial direction of a fuel assembly. In order to support these fuel spacers, spacer support rods are used.

It is necessary that at least one spacer support rod be provided in the central portion of a fuel assembly. A fuel rod was sometimes utilized as a spacer support rod. In such a fuel assembly, the fission rate of the fuel in the central portion thereof is low. In order to make uniform the fission rate of fuel in a fuel assembly, a spacer support rod consisting of a hollow water rod, through which the water can be passed, is used at present.

SUMMARY OF THE INVENTION

An object of the present invention is to provide a circular or regular octagonal independent cell type fuel spacer using a spacer support rod thicker than a fuel rod to increase Moderator/Fuel Ratio and provide a uniform fission distribution in a horizontal cross-section of a fuel assembly.

The inventor of the present invention has discovered that the thickness of at least one water rod, i.e. spacer support rod provided in the vicinity of the central portion of a fuel assembly, be preferably increased to as great an extent as possible to make uniform the fission rate of each part of the fuel assembly, and developed an independent cell type fuel spacer capable of using a thick spacer support rod.

As is clear from the arrangement shown in FIGS. 4 and 5 in the above-mentioned Japanese Patent Laid-open No. 87384/1979, it is necessary in a conventional fuel spacer that a fuel rod and a spacer support rod have the same outer diameter. Accordingly, this fuel spacer cannot be applied to a fuel assembly, in which the outer diameter of a spacer support rod is greater than that of a fuel rod.

An independent cell type fuel spacer according to the present invention, which has been developed with a view to eliminating the above-mentioned drawbacks encountered in a conventional fuel spacer of this kind, consists of a plurality of independent cells for fuel rods, each of which independent cells is composed of a thin sheet cross-sectionally extending substantially along an outer surface of a fuel rod; and an independent cell for a spacer support rod, which independent cell is disposed among a plurality of fuel rod-surrounding independent cells, made of a thin sheet cross-sectionally extending so as to form at least one right-angled corner portion, and adapted to allow a spacer support rod to pass therethrough only when a locking projection provided on the spacer support rod is positioned in the right-angled corner portion of the independent cell, all of the fuel rod-surrounding cells and spacer support rod-surrounding cells being assembled in a lattice type arrangement in such a manner that each of the cells is connected to the adjacent cells.

DESCRIPTION OF THE PREFERRED EMBODIMENTS

Figure 1:
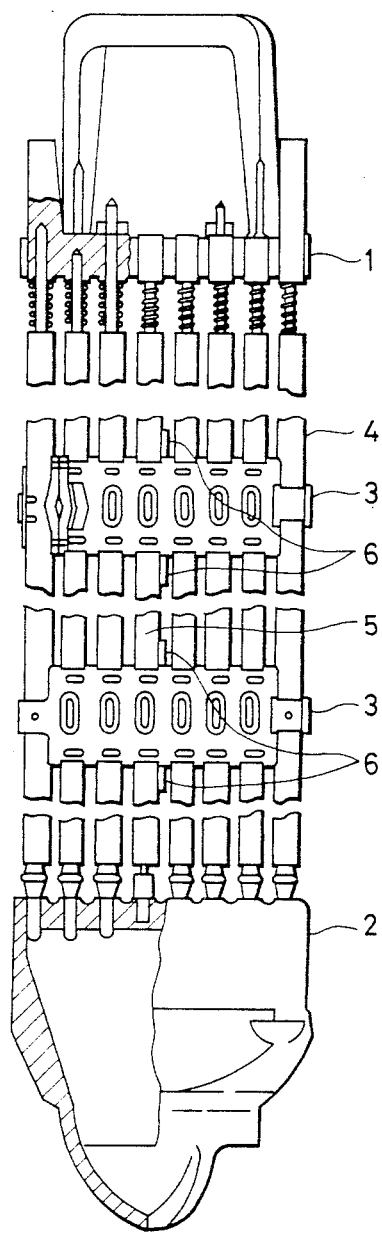
FIG. 1 illustrates the whole fuel assembly used for a boiling reactor.

The present invention will now be described in detail with references to the drawings. FIG. 1 shows an example of a fuel assembly used for a boiling reactor. A plurality of fuel rods 4 supported on upper and lower tie plates 1, 2 are retained by fuel spacers 3 in such a manner that the fuel rods 4 are spaced from one another horizontally at a predetermined distance. The spacers 3 are supported as they are spaced axially at predetermined intervals, on locking projections 6 provided on a small number of spacer support rods 5 fixed to the upper and lower tie plates 1, 2.

EXAMPLE 1

Figure 2:
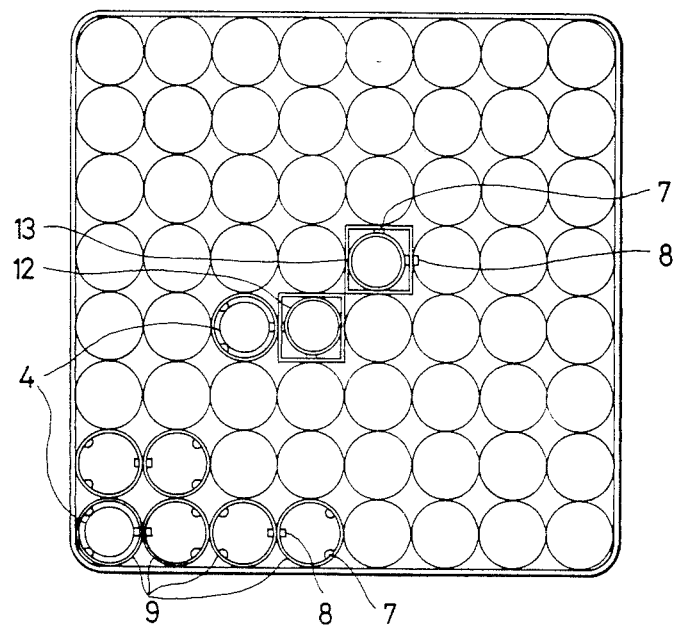
FIG. 2 is a plan view of an embodiment of an independent cell type spacer according to the present invention.

FIG. 2 is a plan view of a spacer embodying the present invention. Each of fuel rod-surrounding independent cells 9 has a circular cross section. These cells 9 having the same shape and dimensions are assembled in a lattice type arrangement and welded together. Each of fuel rods 4 inserted in each of the cells 9 is supported on projections 7 and a vertical plate spring 8. In the spacer in this embodiment, a spacer support rod-surrounding independent cell 13 has a square cross section, and is welded to adjacent fuel rod-surrounding circular cells 9. The length of an outer surface of one side of the square cell 13 is equal to the outer diameter of the circular cell 9. Accordingly, the square cell 13 does not disorder any of the circular cells 0 in a lattice type arrangement. A spacer support rod 12, the outer diameter of which is longer than that of the fuel rod 4, is inserted into the square cell 13 to be supported on the inner surface of the cell including inner projections 7 and vertical plate springs 8 provided thereon.

Figure 4:
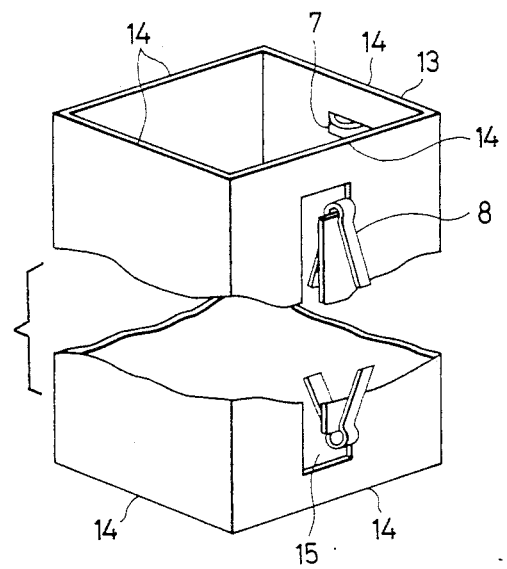
FIG. 4 is a perspective view of the spacer support rod-surrounding square cell shown in FIG. 2.
Figure 5:
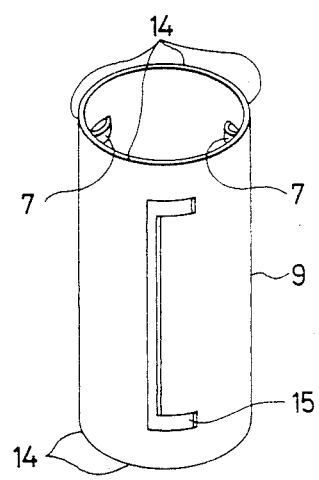
FIG. 5 is a perspective view of a fuel rod-surrounding circular independent cell shown in FIG. 2.

FIG. 4 is a perspective view of the spacer support rod-surrounding square cell 13, and FIG. 5 a perspective view of the fuel rod-surrounding circular independent cell 9. Each of these cells consists of a thin sheet. Reference numeral 7 denotes a projection formed by punching the wall of the cell inward, and reference numeral 8 denotes vertical plate springs engaged with cut grooves 15 in the wall of the cell. The spacer support rod-surrounding square cell 13 is welded to four adjacent fuel rod-surrounding circular independent cells 9 at a total of eight upper and lower welding points 14. The adjacent circular independent cells 9 are welded to each other at upper and lower welding points 14. Thus, a lattice type arrangement shown in FIG. 2 is formed. In this arrangement, the cut grooves 15 in the adjacent cells are opposed to each other. When a vertical plate spring 8 is inserted into the opposed cut grooves 15, it extends into the interior of both of the adjacent cells.

Figure 3:
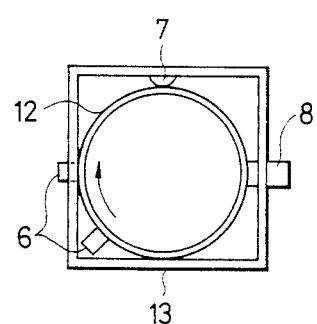
FIG. 3 is a plan view of a spacer support rod-surrounding square cell shown in FIG. 2.

FIG. 3 illustrates how to insert and engage a spacer support rod 12 into and with a square cell 13 in the spacer referred to above. Referring to FIG. 3, the spacer support rod 12 is inserted into the cell 13 in such an angular relationship that the locking projection 6 provided on the spacer support rod 12 is positioned in a corner position of the square cell 13. After the locking projection 6 has been inserted into the cell 13 properly, the rod 12 is turned at 45° to bring the locking projection 6 into engagement with a lower end of a side portion of the cell 13 and thereby support the spacer.

The possibility of increasing the outer diameter of a spacer support rod 12 in the spacer of the above-described construction with respect to the outer diameter of a fuel rod 4 will now be described with reference to FIGS. 6 and 7.

Figure 6:
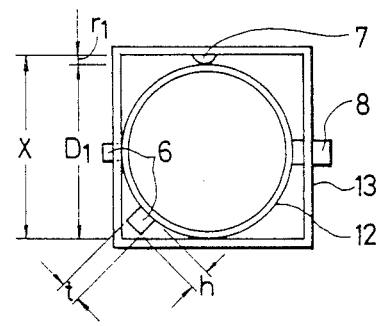
FIGS. 6 and 7 show the details of dimensions of the spacer support rod-surrounding square cell and fuel rod-surrounding circular independent cell shown in FIG. 4 and FIG. 5 respectively.
Figure 7:
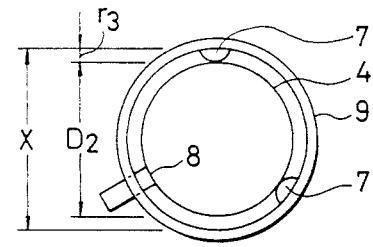

FIG. 6 is a plan view of a spacer support rod-surrounding square cell 13, and FIG. 7 a plan view of a fuel rod-surrounding circular independent cell 9. Reference letter X denotes the length of an inner surface of one side wall of the square cell 13, $r_1$ the height of a projection 7 provided on the cell 13, $D_1$ the outer diameter of a spacer support rod 12, h the height of a locking projection 6 provided on the rod 12, and t the width of the locking projection 6. The inner diameter X of the circular cell 9 is set equal to the above-mentioned length X of the square cell 13. Reference letter $r_3$ denotes the height of a projection 7 provided on a cell 9, and $D_2$ the outer diameter of the fuel rod 4. The values of $r_1$, $r_3$ are determined selectively in such a manner that, when a fuel rod 4 and a spacer support rod 12, which have the largest permissible outer diameter, are inserted into the cell 9 and cell 13, respectively, with the fuel rod 4 brought into press contact with the two projections 7 shown in FIG. 7 by the force of the vertical plate spring 8 shown in the same drawing, and with the spacer support rod 12 brought into press contact with the projection 7 and the walls of the cell shown in FIG. 6 by the force of the plate spring 8 shown in the same drawing, the heights of the projecting portions of the vertical plate springs 8, 8 shown in FIGS. 7 and 6 are equal to the heights of the projections 7, 7, respectively, shown in FIGS. 7 and 6. Accordingly, $$D_1 \leq X - r_1 \tag{1}$$

$$D_2 \leq X - 2r_3 \tag{2}$$

Therefore, when the value of $D_2$ is equal to the largest permissible outer diameter of a fuel rod, the outer diameter $D_1$ of the spacer support rod can be set to a level higher than the level of the outer diameter $D_2$ of a fuel rod by:

$$D_1 - D_2 = 2r_3 - r_1 \tag{3}$$

When a spacer support rod 12 having a locking projection is inserted into a cell having the same shape and dimensions as a fuel rod-surrounding independent cell as in a conventional fuel spacer previously described, it is necessary that the condition, $$D_1 + 2h \leq X \tag{4}$$

be met. On the other hand, when a spacer support rod 12 is inserted into a square cell 13 as in the embodiment of the present invention, a locking projection 6 can be passed through a corner portion of the cell 13 as referred to in the description of FIG. 3, in case that the condition expressed by the following formula (5) is met. And, therefore, the condition expressed by the formula (4) is not necessary to be met.

$$D_1 \leq (\sqrt{2} - 1)\{2\sqrt{2}(X - r_1) - 2h - t\} \tag{5}$$

Namely, unlike a conventional fuel spacer, the embodiment of the present invention permits a spacer support rod, the outer diameter of which is greater than the diameter of a fuel rod, to be inserted into a square cell.

EXAMPLE 2

Figure 8:
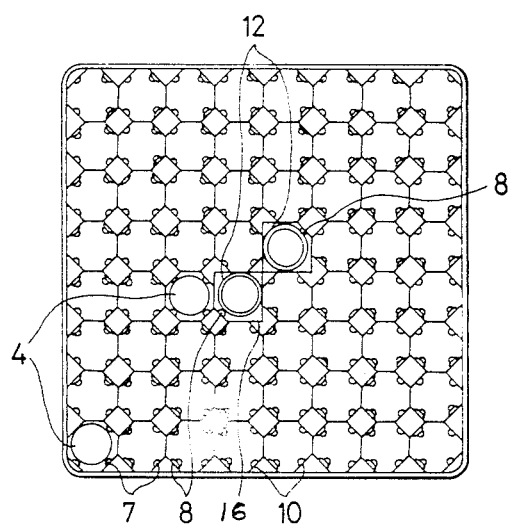
FIG. 8 is a plan view of another embodiment of an independent cell type spacer according to the present invention.

FIG. 8 is a plan view of a second embodiment of the present invention. In this embodiment, an independent cell 10, into which a fuel rod 4 is inserted, consists of a thin sheet and has an octagonal cross section. The adjacent independent cells 10 are welded at their respective four sides to form a lattice type arrangement. Vertical plate springs 8 are provided on two sides of each of the cells 10, and projections 7 are provided on the sides thereof which are opposed to the above-mentioned two sides. The construction of these vertical plate springs 8 and projections 7 is the same as that of the corresponding parts of Example 1. In Example 2, a cell 16, into which a spacer support rod 12 is inserted, consists of a thin sheet and has a false square cross section provided at its one corner portion with a diagonal side having the same shape and dimensions as a side of the adjacent octagonal cell 10. The cell 16 is welded to the adjacent cells 10. The spacer support rod 12 has an outer diameter greater than the diameter of the fuel rod 4, and is held as it is pressed against the walls of the cell 16 by the vertical springs 8 provided on the diagonal sides thereof. The condition of the spacer support rod 12 thus held in the cell 16 may be easily understood from FIG. 9, which is an enlarged plan view of the cell 16.

Figure 9:
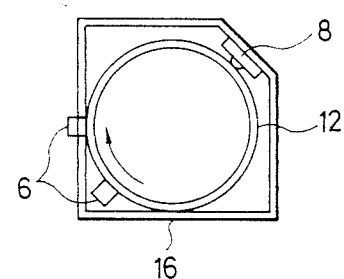
FIG. 9 is a plan view of a spacer support rod-surrounding cell shown in FIG. 8.

In order to set a spacer support rod 12 in a cell 16, the former is inserted into the latter while utilizing a right-angled corner portion of the cell 16 shown in FIG. 9, as a space for passing a locking projection 6 of the rod 12 therethrough. After the locking projection 6 has been passed through the space, the rod 12 is turned at 45° to engage the locking projection 6 with a lower end of a side portion of the cell 16 and thereby support the spacer.

Since this Example is constructed as mentioned above, it is clear that this Example has the same effect as Example 1 with respect to the outer diameter of the spacer support rod.

We claim:

1. An independent cell type fuel spacer for a nuclear reactor having a plurality of fuel rods and a water rod having a locking projection, comprising:
   a plurality of independent cells for surrounding fuel rods, each of which fuel rod-surrounding independent cells being composed of a thin sheet cross-sectionally extending along an outer surface of a fuel rod;
   an independent cell for surrounding a water rod, which water rod-surrounding independent cell is of a different cross-sectional shape than said fuel rod-surrounding independent cells, disposed among a plurality of said fuel rod-surrounding independent cells, made of a thin sheet cross-sectionally extending so as to form at least one substantially right-angled corner portion and forming means to allow water rod to pass therethrough only when the locking projection provided on the water rod is positioned in said right-angled corner portion of said water rod-surrounding independent cell, said water rod-surrounding independent cell having a plurality of planar surfaces exhibiting exterior transverse widths along the directions of said surfaces substantially equal in value to the least exterior transverse distance between geometrically opposite sides of said fuel rod-surrounding independent cells and providing greater interior cross-sectional area for the water rod than is provided by any of said fuel rod-surrounding independent cells for said fuel rods;
   means for causing said water rod to directly engage interior surfaces of said water rod-surrounding independent cell; and
   means for connecting all of said fuel rod-surrounding independent cells and water rod-surrounding independent cell in a lattice type arrangement in such a manner that each of said cells is connected to adjacent cells;
   whereby the outer diameter of a water rod to be inserted into said water rod-surrounding independent cells may be greater than the outer diameter of said fuel rods.

2. An independent cell type fuel spacer according to claim 1, wherein said fuel rod-surrounding independent cells have a circular cross section, said water rod-surrounding independent cell having a square cross section 3. An independent cell type fuel spacer according to claim 1, wherein said fuel rod-surrounding independent cells have a regular octagonal cross section, and said water rod-surrounding independent cell has a plurality of joined sides forming three corner portions of a square and one corner portion with a 45° diagonal side engageable with one side of said fuel rod-surrounding independent cells.

4. An independent cell type fuel spacer for a nuclear reactor having a plurality of fuel rods and a water rod having a locking projection, comprising:
   a plurality of independent cells for surrounding fuel rods, each of which fuel rod-surrounding independent cells is composed of a thin sheet cross-sectionally extending along an outer surface of a fuel rod;
   an independent cell for surrounding a water rod, which water rod-surrounding independent cell has a different cross-sectional shape than the fuel rod-surrounding independent cells for fuel rods, a larger cross-sectional dimension permitting at least one locking projection provided on the water rod to pass therethrough, and a smaller cross-sectional dimension permitting engagement with the locking projection after rotation of the water rod, said water rod-surrounding independent cell having a plurality of planar surfaces exhibiting exterior transverse widths along the directions of said surfaces being substantially equal in value to the least exterior transverse distance between geometrically opposite sides of said fuel rod-surrounding independent cells and providing greater interior cross-sectional area for the water rod than is provided by any of said fuel rod-surrounding independent cells for the fuel rods;
   means for causing said water rod to directly engage interior surfaces of said water rod-surrounding independent cell;
   means for connecting all of said fuel rod-surrounding cells and water rod-surrounding cell in a lattice type arrangement in such a manner that each of said cells is connected to adjacent cells;
   whereby the outer diameter of a water rod to be inserted into said water rod surrounding independent cells may be greater than the outer diameter of said fuel rods.

5. An independent cell type fuel spacer according to claim 4, wherein said fuel rod-surrounding independent cells have a circular cross section, said water rod-surrounding independent cell having a square cross section.

6. An independent cell type fuel spacer according to claim 4, wherein said fuel rod-surrounding independent cells have a regular octagonal cross section, and said water rod-surrounding independent cell has a plurality of joined sides forming three corner portions of a square and one corner portion with a 45° diagonal side engageable with one side of said fuel rod-surrounding independent cells.

7. An independent cell type fuel spacer according to claim 1, further including at least one fuel spacer axially between and supporting axially aligned water rods; an upper tie plate and a lower tie plate, sandwiching therebetween said fuel spacer and said cells.

8. An independent cell type fuel spacer according to claim 1, including a water rod extending through said support rod-surrounding independent cell, being located within the central portion of the assembled lattice type arrangement, and having therein a moderator; a plurality of fuel rods respectively within said fuel rod surrounding independent cells and said fuel rods being of substantially less diameter than said water rod; said fuel rod-surrounding independent cells and water rod-surrounding independent cells being directly welded to each other to form said lattice type arrangement, and all of said independent cells having weld points with adjacent cells on opposite sides being equally spaced apart, and the water rod-surrounding independent having a first transverse dimension permitting the passage of the locking projection, said first transverse dimension being substantially larger than any transverse dimension of the fuel rod-surrounding independent cells; whereby said arrangement provides means for increasing the Moderator/Fuel Ratio within the central portion of the assembly as compared to a correspondingly constructed assembly having only identical cells and thereby provides a uniform fission distribution in a horizontal cross-section of the fuel assembly.

9. An independent cell type fuel spacer according to claim 8, wherein all of said cells have a through groove in their side walls and said cells are positioned by said connecting means with each through groove aligned with and adjacent to a corresponding through groove in a side wall of an adjacent cell; and further including a plurality of vertical bent plate springs extending through both grooves of and projecting into the interior of each of the adjacent cells so that each of said springs will simultaneously engage the rods contained within the adjacent cells; at least said cells for fuel rods having a plurality of peripherally spaced rigid projection means opposing the corresponding one of said plurality of springs for receiving the fuel rod between opposed projection means and springs; said cell for the water rod having at least one interior wall surface opposed to one of said plurality of springs and directly engaging the water rod and thereby accommodating a water rod having a greater diameter than the fuel rods.

10. An independent cell type fuel spacer according to claim 8, wherein all of said cells have a through groove in their side walls and said cells are positioned by said connecting means with each through groove aligned with and adjacent to a corresponding through groove in a side wall of an adjacent cell; and further including spring means extending through both grooves of and projecting into the interior of each of the adjacent cells for simultaneously engaging the rod contained within each of the adjacent cells; at least said fuel rod-surrounding independent cells having a plurality of peripherally spaced rigid projections opposing said spring means for receiving the fuel rod between opposed projections and spring means; and said cell for the water rod having at least one interior wall surface opposed to said spring means for directly engaging the water rod and thereby accommodating a water rod having a greater diameter than the fuel rods.

11. An independent cell type fuel spacer according to claim 9, further including at least one fuel spacer axially between and supporting axially aligned water rods; an upper tie plate and a lower tie plate, sandwiching therebetween said fuel spacer and said cells.

12. An independent cell type fuel spacer according to claim 10, further including at least one fuel spacer axially between and supporting axially aligned water rods; an upper tie plate and a lower tie plate, sandwiching therebetween said fuel spacer and said cells.

13. An independent cell type fuel spacer according to claim 4, further including at least one fuel spacer axially between and supporting axially aligned water, an upper tie plate and a lower tie plate, sandwiching therebetween said fuel spacer and said cells.

14. An independent cell type fuel spacer according to claim 4, including a water rod extending through said water rod-surrounding independent cell, being located within the central portion of the assembled lattice type arrangement, and having therein a moderator; a plurality of fuel rods respectively within said fuel rod surrounding independent cells and said fuel rods being of substantially less diameter than said water rod; said fuel rod surrounding independent cells and water rod-surrounding independent cells being directly welded to each other to form said lattice type arrangement, and all of said independent cells having weld points with adjacent cells on opposite sides being equally spaced apart, and the water rod-surrounding independent cell having a first transverse dimension permitting the passage of the locking projection said first transverse dimension being substantially larger than any transverse dimension of the fuel rod-surrounding independent cells; whereby said arrangement provides means for increasing the Moerator/Fuel Ratio within the central portion of the assembly as compared to a correspondingly constructed assembly having only identical cells and thereby provides a uniform fission distribution in a horizontal cross-section of the fuel assembly.

15. An independent cell type fuel spacer according to claim 14, wherein all of said cells have a through groove in their side walls and said cells are positioned by said connecting means with each through groove aligned with an adjacent to a corresponding through groove in a side wall of an adjacent cell; and further including a plurality of vertical bent plate springs extending through both grooves of and projecting into the interior of each of the adjacent cells so that each of said springs will simultaneously engage the rod contained within each of the adjacent cells; at least said cells for fuel rods having a plurality of peripherally spaced rigid projection means opposing the corresponding one of said plurality of springs for receiving the fuel rod between opposed projection means and springs; said cell for the water rod having at least one interior wall surface opposed to one of said plurality of springs for directly engaging the water rod and therby accommodating a water rod having a greater diameter than the fuel rods.

16. An independent cell type fuel spacer according to claim 14, wherein all of said cells have a through groove in their side walls and said cells are positioned by said connecting means with each through groove aligned with and adjacent to a corresponding through groove in a side wall of an adjacent cell; and further including spring means extending through both grooves of and projecting into the interior of each of the adjacent cells for simultaneously engaging the rods contained within the adjacent cells; at least said fuel rod-surrounding independent cells having a plurality of peripherally spaced rigid projections opposing said spring means for receiving the fuel rod between such projections and spring means; and said cell for the water rod having at least one interior wall surface opposed to said spring means for directly engaging the water rod and thereby accommodating a water rod having a greater diameter than the fuel rods.

17. An independent cell type fuel spacer according to claim 15, further including at least one fuel spacer axially between and supporting axially aligned water rods; an upper tie plate and a lower tie plate, sandwiching therebetween said fuel spacer and said cells.

18. An independent cell type fuel spacer according to claim 16, further including at least one fuel spacer axially between and supporting axially aligned water rods; an upper tie plate and a lower tie plate, sandwiching therebetween said fuel spacer and said cells.

19. An independent cell type fuel spacer for a nuclear reactor having a plurality of fuel rods and a water rod having a locking projection, comprising:
 a plurality of independent cells for surrounding fuel rods, each of which fuel rod-surrounding independent cells being composed of a thin sheet cross-sectionally extending along an outer surface of a fuel rod;
 an independent cell for surrounding a water rod, which water rod-surrounding independent cell is of a different cross-sectional shape than said fuel rod-surrounding independent cells, disposed among a plurality of waid fuel rod-surrounding independent cells, made of a thin sheet cross-sectionally extending so as to form at least one substantially right-angled corner portion and forming means to allow the water rod to pass therethrough only when the locking projection on the water rod is positioned in said right-angled corner portion of said water rod-surrounding independent cell, said water rod-surrounding independent cell having a plurality of planar surfaces exhibiting exterior transverse widths along the directions of said surfaces substantially equal in value to the least exterior transverse distance between geometrically opposite sides of said fuel rod-surrounding independent cells and providing greater interior cross-sectional area for the water rod than is provided by any of said fuel rod-surrounding independent cells for said fuel rods;

said water rod-surrounding independent cell having at least four sides, two of said four sides being planar, forming said substantially right-angled corner portion, and directly engaging a water rod insertable into said water rod-surrounding independent cell, and means for causing said water rod to directly engage said two planar sides; and means for connecting all of said fuel rod-surrounding independent cells and water rod-surrounding independent cell in a lattice type arrangement in such a manner that each of said cells is connected to adjacent cells;

whereby the outer diameter of a water rod to be inserted into said water-rod surrounding independent cells may be greater than the outer diameter of said fuel rods.

20. An independent cell type fuel spacer according to claim 1, wherein said fuel rod-surrounding independent cells have a circular cross section, said water rod-surrounding independent cell has a square cross-section.

21. An independent cell type fuel spacer according to claim 1, wherein said fuel rod-surrounding independent cells have a regular octagonal cross section, and said water rod-surrounding independent cell has a plurality of joined sides forming three corner portions of a square and one corner portion with a 45° diagonal side engageable with one side of said fuel rod-surrounding independent cells.

22. An independent cell type fuel spacer for a nuclear reactor having a plurality of fuel rods and a water rod having a locking projection, comprising:

a plurality of independent cells for surrounding fuel rods, each of which fuel rod-surrounding independent cells is composed of a thin sheet cross-sectionally extending along an outer surface of a fuel rod;

an independent cell for surrounding a water rod, which water rod-surrounding independent cell has a different cross-sectional shape than the fuel rod-surrounding independent cells for fuel rods, a larger cross-sectional dimension permitting at least one locking projection provided on the water rod to pass therethrough, and a smaller cross-sectional dimension permitting engagement with the locking projection after rotation of the water rod, said water rod-surrounding independent cell having a plurality of planar surfaces exhibiting exterior transverse widths along the directions of said surfaces substantially equal in value to the least exterior transverse distance between geometrically opposite sides of said fuel rod-surrounding independent cell and providing greater interior cross-sectional area for the water rod than is provided by any of said fuel rod-surrounding independent cells for the fuel rods;

said water rod-surrounding independent cell having at least four sides, two of said four sides being planar, forming said subtantially right-angled corner portion, and directly engaging a water rod insertable into said water rod-surrounding independent cell, and means for causing said water rod to directly engage said two planar sides; and means for connecting all of said fuel rod-surrounding cells and water rod-surrounding cell in a lattice type arrangement in such a manner that each of said cells is connected to adjacent cells;

whereby the outer chamber of a water rod to be inserted into said water-rod surrounding independent cells may be greater than the outer diameter of said fuel rods.

23. An independent cell type fuel spacer according to claim 4, wherein said fuel rod-surrounding independent cells have a circular cross section, said water rod-surrounding independent cells have a circular cross section, said water rod-surrounding independent cell has a square cross section.

24. An independent cell type fuel spacer according to claim 4, wherein said fuel rod-surrounding independent cells have a regular octagonal cross section, and said water rod-surrounding independent cell has a plurality of joined sides forming three corner portions of a square and one corner portion with a 45° diagonal side engageable with one side of said fuel rod-surrounding independent cells.

* * * * *